350-437

OR 3,588,227

United States

[11] 3,588,227

| [72] | Inventors | Tadaaki Yamamoto |
| | | Kawasaki-shi; |
| | | Hiroshi Takenaka, Tokyo, Japan |
| [21] | Appl. No. | 817,443 |
| [22] | Filed | Apr. 18, 1969 |
| [45] | Patented | June 28, 1971 |
| [73] | Assignee | Nippon Kogaku K.K. |
| | | Tokyo, Japan |
| [32] | Priority | Apr. 25, 1968 |
| [33] | | Japan |
| [31] | | 43/27336 |

[54] LENS SYSTEM FOR FOCUSSING TWO SPACED OBJECTS ON THE SAME FOCAL PLANE
7 Claims, 3 Drawing Figs.

| [52] | U.S. Cl. | 350/194 |
| [51] | Int. Cl. | G02b 3/10 |
| [50] | Field of Search | 350/194, 197, 213 |

[56] References Cited
UNITED STATES PATENTS
| 2,546,996 | 4/1951 | Garutso | 350/197 |
| 2,651,237 | 9/1953 | Garutso | 350/197 |
| 2,651,238 | 9/1953 | Garutso | 350/197 |

FOREIGN PATENTS
| 335,696 | 10/1930 | Great Britain | 350/194 |
| 791,312 | 2/1958 | Great Britain | 350/194 |
| 1,010,447 | 11/1965 | Great Britain | 350/194 |

*Primary Examiner*—David Schonberg
*Assistant Examiner*—Paul A. Sacher
*Attorney*—Anton J. Wille ABSTRACT: A lens system is provided for focusing two spaced objects on the same focal plane, the images of the objects being of equal magnification. The lens system includes a positive front lens group having a focal length $f$ and a positive rear lens group having a focal length $f'=f^2/\Delta x$ where $\Delta x$ is the distance between the two objects. The region below the optical axis of the rear lens group is of zero refractive power and the distance between the principal planes of the two lens groups is made equal to the focal length $f$ of the first lens group. The lens system may be used either with direct or reflected types of illumination.

LENS SYSTEM FOR FOCUSSING TWO SPACED OBJECTS ON THE SAME FOCAL PLANE

This invention relates to an optical system and method for producing double focused images having the same magnification.

There have been known the Garutso-type lens, Meslin Billet split lens, double focusing filter, etc. for producing the double focusing optical system. However, when these optical systems are utilized as they are, they have such disadvantages that the magnifications of two objects located spaced apart from each other vary. It is therefore impossible to compare or collate the shapes and dimensions of these two objects.

The primary object of this invention is to provide an improved method for producing on the same focal plane with the same magnification the images oriented in the same direction of two objects located in front of the objective in spaced-apart relation in the direction of the optical axis of the objective, thereby eliminating the above-described defect.

In brief, the method for producing double focused images according to this invention is such that a front group of positive lenses having a focal length $f$ is disposed relative to a rear group of positive lenses having a focal length $f_1 = f^2/\Delta x$ in such a manner that the principal planes of the front and rear lens groups are spaced apart from each other by a distance equal to the focal length $f$ of the front lens group; and either of said two groups is composed of a so-called double focusing optical system, whereby two objects which are disposed beyond the focal length of the front lens group in front of front lens group in spaced-apart relation with each other by an optional distance $\Delta x$ are focused on the same focal plane with the same magnification.

This invention will be described in detail referring to illustrative embodiments of this invention shown in the attached drawing, in which.

Figure 1:
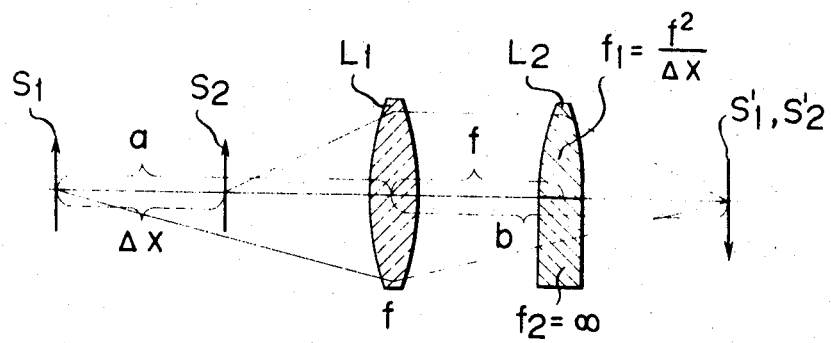
FIG. 1 shows a fundamental principle of this invention.

The fundamental principle of this invention will be described in detail with reference to FIG. 1. A positive lens generally designated by $L_1$ has a focal length $f$ and constitutes a front lens group. A split positive lens designated by $L_2$ has a focal length $f_1$ and constitutes a rear lens group and the principal plane thereof is disposed at the focal point of the front lens group $L_1$. The first object $S_1$ is located at a position at a distance $a$ in front of the front lens group $L_1$. The second object $S_2$ is in position between the first object $S_1$ and the front lens group $L_1$, and is spaced apart from the first object $S_1$ by an optional distance $\Delta x$.

Because of the above-described arrangement, when the first object $S_1$ is focused as an image $S_1'$ through the front lens group $L_1$ at a point spaced apart from the principal plane of the front lens group $L_1$ by a distance $b$, the following relation is held:

$$\frac{1}{a} + \frac{1}{b} = \frac{1}{f} \quad (1)$$

and magnification: $m = b/a$ (2)

When the second object $S_2$ is focused through the front and rear lens groups $L_1$ and $L_2$ at the same point of the image $S_1'$ as an image $S_2'$, the following relation is held:

$$\frac{1}{a - \Delta x} + \frac{1}{y} = \frac{1}{f} \quad (3)$$

and $$\frac{1}{f - y} + \frac{1}{b - f} = \frac{1}{f_1} \quad (4)$$

where $y$ is the distance between the point where the image of the second object $S_2$ focused through the front lens group $L_1$ and the principal plane.

It is of course understood that the objects are positioned so as to satisfy the relation $a - \Delta x > f$. In this case the magnification is given by $$m' = \frac{y}{a - \Delta x} \cdot \frac{b - f}{f - y} \quad (5)$$

In order to eliminate $y$ from Eqs. (3) and (4), obtain first $y$ from Eq. (3)

$$y = \frac{f(a - \Delta x)}{(a - \Delta x) - f} \quad (6)$$

by rearranging Eq. (4)

$$f - y = \frac{f_1(b - f)}{(b - f) - f_1} \quad (7)$$

and substituting Eq. (6) in Eq. (7), we have $$f - \frac{f(a - \Delta x)}{(a - \Delta x) - f} = \frac{f_1(b - f)}{(b - f) - f_1}$$

Hence, $$f^2[f_1 - (b - f)] = f_1(b - f)[(a - \Delta x) - f] \quad (8)$$

From a general formula of $$(b - f)(a - f) = f^2$$

we have $$b - f = \frac{f^2}{a - f}$$

Substituting Eq. (9) into Eq. (8), we have $$f_1 \Delta x = f^2$$

Hence $$f_1 = f^2/\Delta x.$$

Therefore, the focal length $f_1$ of the rear lens group becomes $f^2/\Delta x$.

From Eqs. (2) and (5), we have the magnifications of the images $S_1'$ and $S_2'$ of the first and second objects $S_1$ and $S_2$ $$m = b/a$$

and $$m' = \frac{y}{a - \Delta x} \cdot \frac{b - f}{f - y}$$

Substituting Eqs. (6) and (7), we have $$m' = \frac{f}{(a - \Delta x) - f} \cdot \frac{(b - f) - f_1}{f_1} \quad (10)$$

Substituting the general formula above $$b - f = f^2/(a - f)$$

and $$f_1 = f^2/\Delta x$$

into Eq. (10), we have $$m' = b/a$$

That is, $$m = m'$$

This means that we can have the images having the same magnification.

In order to make easier the understanding of the principle, in FIG. 1 we assumed $$\Delta x = f$$

$$a = 2f$$

and $$b = 2$$

It is to be understood that the split lens group positioned at the focal point of the front lens group $L_1$ backwardly thereof can be composed of lenses having different focal lengths of $f_2$ and $f_3$ respectively, $(f_2 \ne f_3)$. Therefore, two points spaced apart from the object $S_2$ by distances of $$\Delta x_1 = f^2/f_1 \text{ and } \Delta x_2 = f^2/f_2$$

are focused. That is, two points satisfying the condition of $$\Delta x = \Delta x_1 - \Delta x_2 = f^2\left(\frac{1}{f_1} - \frac{1}{f_2}\right)$$

are focused.

Furthermore, when either of two lenses is of plane parallel surfaces, that is when the focal length $f_2$ becomes infinity, then $\Delta x = x_1$.

Figure 2:
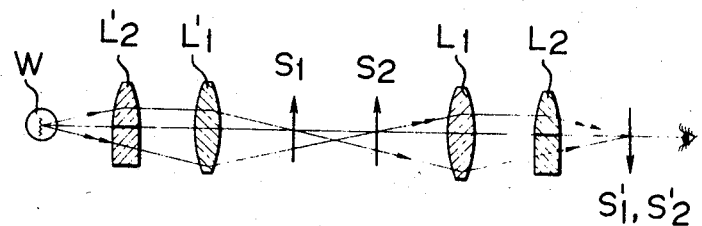
FIG. 2 is a schematic view illustrating the arrangement of an embodiment of this invention when combined with a direct exposure or transmission type illumination system.

This is shown in FIG. 2 illustrating an embodiment of the optical system combined with the transmission-type illumination system according to this invention. In FIG. 2, W designates an illumination source; $L_2'$ and $L_1'$ consist illumination optical system; $S_1$ and $S_2$, a first and a second objects respectively; $L_1$, a front lens group; $L_2$, a rear lens group; and $S_1'$ and $S_2'$, images of the objects $S_1$ and $S_2$ respectively. The disposition and arrangement of the objects $S_1$ and $S_2$: and the front and rear lens groups $L_1$ and $L_2$ must be effected according to this invention. The illumination optical system $L_2'$ and $L_1'$ is symmetrical with the focusing optical system $L_1$ and $L_2$ in geometrical portion and in function. In FIG. 2, the rear lens groups is shown as split lens, but in practice in order to facilitate the assembly of the lenses a plane parallel glass may be filled up at the cutoff portion of the split lens. When the optical system is arranged as described above with reference to FIG. 2, both of the objects $S_1$ and $S_2$ can be simultaneously illuminated through the lens groups $L_2'$ and $L_1'$ with the same intensity of illumination lights and the images of the objects $S_1$ and $S_2$ can be focused upon the same focal plane with the same magnification and same orientation, through the front and rear lens groups $L_1$ and $L_2$.

Figure 3:
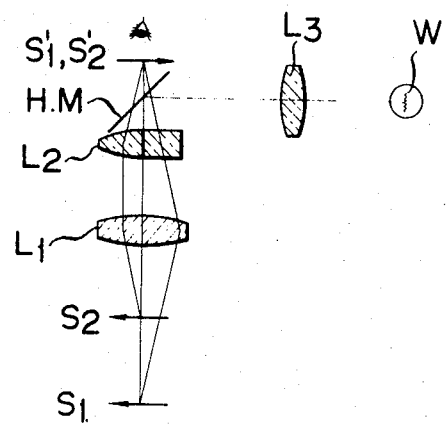
FIG. 3 is a schematic view illustrating the arrangement of another embodiment of this invention when combined with a reflecting type illumination system.

Next this invention will be described with reference to another embodiment shown in FIG. 3. This is the type in which the objects are illuminated by reflected illumination. In FIG. 3, W designates an illumination source; $L_3$, a condenser lens; HM, a semitransparent mirror inclined relative to the optical axis of the objective; $L_2$, a rear lens group; $L_1$, a front lens group; $S_2$ and $S_1$, a second and first objects respectively; and $S_1'$ and $S_2'$, the focused images thereof respectively. Since the objects, lenses and the illumination source are arranged and disposed according to this invention as described in detail hereinabove, the light rays emanated from the illumination source pass through the condenser lens $L_3$, the semitransparent mirror HM, the rear lens $L_2$ and the front lens $L_1$ and illuminate uniformly the second and first objects $S_2$ and $S_1$ with the same intensity of illumination. Furthermore, these front and rear lens groups $L_1$, $L_2$ constitute the image producing optical system, thus focusing the images $S_1'$ and $S_2'$ on the same focal plane with the same magnification and orientation.

It is to be understood that the split lens may be substituted by ordinary double focusing optical system such as Fresnel lens, double focusing filters and the like, the ring lens and the like without departing from the spirit and scope of this invention as defined in the appended claim.

As described above, according to this invention it is possible to focus upon the same focal plane with the same magnification and orientation the images $S_1'$, $S_2'$ of two objects $S_1$ and $S_2$ spaced apart from each other in front of the objective by an optional distance $\Delta x$. Thus, this invention accrues many industrial advantages, for example, when the optical system according to this invention can be applied to operation to compare or to collate precisely the mask and wafer of integrated circuits which are recently used to an increasing extent, the mask and the wafer can be held in spaced-apart relation with each other by a distance of $\Delta x$ in collating or comparing with each other so that the mask and wafer can be positively prevented from being damaged or broken, thus increasing the service life of the mask.

We claim:

1. An objective for producing double images of two subjects placed at different focused distance points, comprising a front converging member and a rear bifocal length optical member between said front member and the images and consisting of two portions having different powers respectively, the distance between the principal planes of said members being equal to the focal length of said front member, the focused images being formed on the same plane in the same magnification.

2. An objective lens system according to claim 1, wherein one of said portions of said rear member is of plane parallel surfaces and other of said portions is a positive lens.

3. An objective according to claim 1, further comprising a semireflecting mirror for directing illuminating light to the subjects along the optical axis of said rear and front members.

4. An optical system for focusing two spaced objects on the same focal plane comprising a first positive biconvex lens with uniform surfaces spaced apart from a second split positive convex lens group off-axially spaced, wherein the region from the optical axis and below is of zero refractive power and wherein the space between the front and rear lens groups is equal to the focal length of the first lens group.

5. An optical system according to claim 4, wherein the front lens group has a focal length of $f$ and the rear lens group from and above the optical axis has a focal length of $f_1 = f^2/\Delta x$, where $\Delta x$ is the distance between the two spaced objects.

6. An optical system according to claim 5 wherein the focal lengths $f$ and $f1$ of the two lens groups satisfies the relation of $$x = f^2\left(\frac{1}{f_1} - \frac{1}{f_2}\right)$$

7. An optical system according to claim 4, wherein a semireflecting mirror is disposed between the rear lens group and the focal plane, and a source of illumination reflected from said mirror and passing through said second and first lens groups for illuminating the spaced objects.